Nov. 10, 1925.
A. A. UNRUH
1,560,919
FISHING LINE REEL
Filed Oct. 23, 1924
2 Sheets-Sheet 2
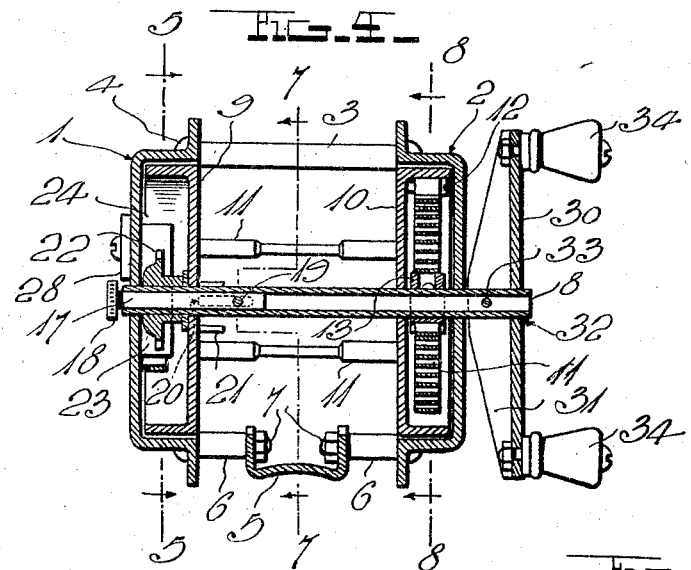
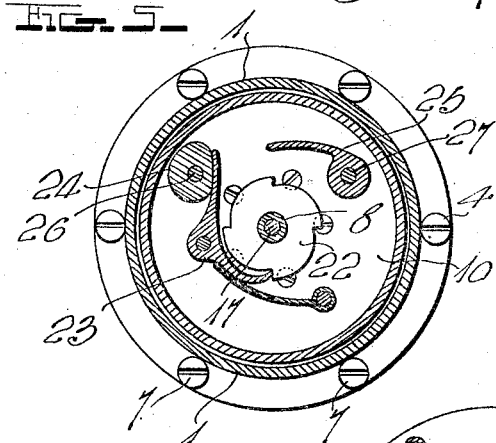
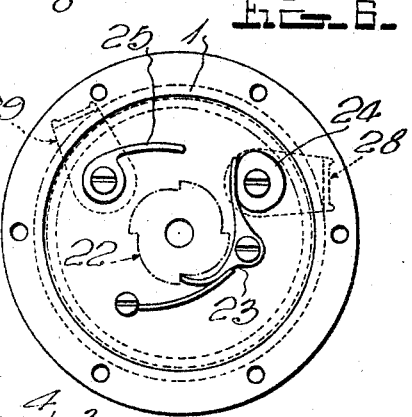
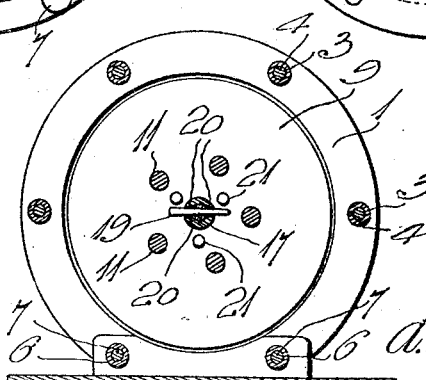
Inventor
A. A. Unruh
Witness
H. Woodard
By H. B. Willson Yeo
Attorneys Patented Nov. 10, 1925.

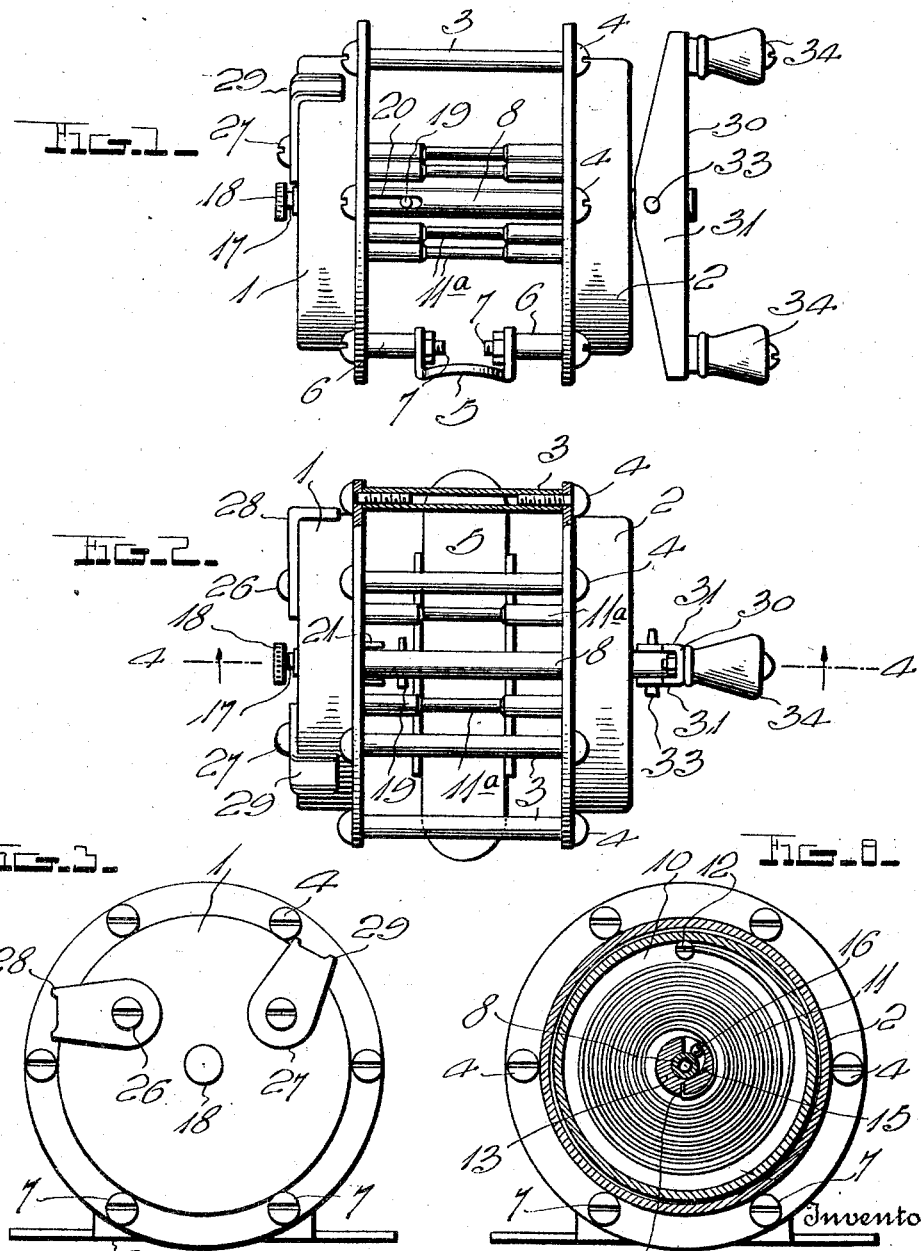

1,560,919

UNITED STATES PATENT OFFICE.

ALBERT A. UNRUH, OF PORTLAND, OREGON, ASSIGNOR OF ONE-HALF TO DAVID O. FISHER, OF PORTLAND, OREGON.

FISHING-LINE REEL.

Application filed October 23, 1924. Serial No. 745,435.

*To all whom it may concern:*

Be it known that I, ALBERT A. UNRUH, a citizen of the United States, residing at Portland, in the county of Multnomah and State of Oregon, have invented certain new and useful Improvements in Fishing-Line Reels; and I do declare the following to be a full, clear, and exact description of the invention, such as will enable others skilled in the art to which it appertains to make and use the same.

My invention aims to provide a new and improved fishing line reel of the type employing a spring connection between the reel and the hand-operated reel-driving shaft, so that large fish jerking upon the line can not snap the latter, but will merely pay out the line to some extent, the power of the spring connection increasing proportionately with the amount of line so unwound from the reel.

The invention also relates to a structure in which the reel is self-winding after the line has been drawn therefrom in the manner above set forth, so that if the fish suddenly darts toward the fisherman, the line will be immediately wound upon the reel as it is slackened, instead of permitting it to badly snarl, as very often occurs.

One object of the invention is to make provision whereby, after rewinding of the line in the manner just set forth to an extent at which the power of the spring is expended, the reel may freely spin in line-winding direction to further wind the line, if the latter is not held taut by the fish.

Another aim is the provision of a reel which will be simple and inexpensive, yet will be efficient and in every way desirable.

With the foregoing in view, the invention resides in the novel subject matter hereinafter described and claimed, the description being supplemented by the accompanying drawings.

Figures 1 and 2 are elevations of the reel looking in different directions, a portion of Fig. 2 being broken away and in section.

Figure 3 is an end elevation.

Figure 4 is a longitudinal sectional view as indicated by line 4—4 of Fig. 2.

Figure 5 is a transverse sectional view on line 5—5 of Fig. 4.

Figure 6 is an inner side elevation of one of the cup-like end members of the supporting frame, showing the friction brake and a part of the shaft-controlling ratchet mechanism therein.

Figure 7 is a vertical sectional view on line 7—7 of Fig. 4.

Figure 8 is a vertical section as indicated by line 8—8 of Fig. 4, showing more particularly the elastic connection between the reel and its driving shaft.

In the form of construction selected for illustration in the present application, I have shown a main supporting frame which includes a pair of cup-like end members 1 and 2 which are spaced apart by sleeves 3, to which they are secured by screws 4. These end members are spaced from an elongated attaching plate 5 by spacing sleeves 6, bolts 7 being passed through said sleeves, and members and portions of the plate, to secure them together.

A reel-driving shaft 8 passes rotatably through central openings in the end members 1 and 2, said shaft being preferably tubular, and mounted upon this shaft, are two cup-shaped end members 9 and 10 which are connected at intervals by rods 11$^a$ to form a reel. This reel structure is preferable, although it need not of course be followed in all instances, as is also true of the general supporting or frame structure. The end members 9 and 10 of the reel rotate within the end members 1 and 2 and the major portions of the two sets of end members are spaced apart, as shown most clearly in Fig. 4. Within the space between the members 2 and 10, I have shown a spiral spring 11 having its outer end connected by a screw 12 or other desired means, with said member 10, while the inner end of said spring has a one-way driving connection with the shaft 8. This connection is preferably established by providing a sleeve 13 fitting loosely around the shaft 8, securing the inner end 14 of the spring 11 to said sleeve, providing the latter with a cam recess 15 and positioning a ball or other clutch roller 16 in said recess. This connection permits free turning of the reel with respect to the shaft, in one direction only and when the shaft is turned in a direction to wind a line upon the reel, the connection in question drives the spring 11 and the latter in turn drives the reel.

Provision is made for positively connecting the reel with the shaft 8 whenever desired. In the present showing, a short rod 17 is slidable in the bore of the shaft 8, at the end of the latter remote from the spring 11, the outer end of said rod being provided with an operating knob 18, while its inner end is equipped with a transverse pin 19 or with some other suitable member providing a projection or projections for passage through a slot or slots 20 in the shaft, so as to be moved into operative engagement with inwardly projecting studs or the like 21 on the end member 9 of the reel, when the rod 17 is pulled outwardly. When this rod is forced inwardly as shown in Fig. 4, the pin or the like 19 will clear the studs or other projections 21 and hence the only connection between the shaft 8 and the reel, is by means of the spring 11, and such an elastic connection between said reel and shaft, will prevent a sharp jerk on the line from breaking the latter, as will be readily understood.

Located in the space between the end members 1 and 9, I have shown a ratchet wheel 22 on the shaft 8, a spring-pressed dog 23 co-operable with said ratchet wheel, a cam 24 for disengaging the dog, and a brake 25 for frictional engagement with the rim portion of said end member 9. The cam 24 and brake 25 are mounted on rock shafts 26 and 27 respectively, and the outer ends of these rock shafts are provided with appropriate thumb pieces or handles 28 and 29. Obviously, the brake may be thrown into play whenever desired and the cam 24 may be manipulated to permit or prevent action of the dog and ratchet, as occasion may require.

In providing an effective operating handle for the shaft 8, I prefer to use a strip of sheet metal and bend it to provide an elongated central portion 30 and a pair of parallel longitudinal side flanges 31, the shaft 8 being received between the central portions of said side flanges and in a central opening 32 in the portion 30. The flanges 31 are secured to the shaft by a suitable fastener 33 passing through these parts, said fastener and the relation of the shaft with the parts 30 and 31, serving to form effective connecting means between said shaft and parts. The ends of the central portion 30 are provided with suitable handles or knobs 34 completing a well balanced, simple and durable handle structure.

In explaining the operation of the reel, let us assume that the line has been cast, the rod 17 pulled outwardly to establish a positive connection between the reel and the shaft 8, and that the dog 23 is in operative engagement with the ratchet wheel 22 of the shaft 8. If now, a fish bites, a jerk on the pole will correspondingly jerk the line to effectively engage the hook with the prey. Then, the rod 17 may be immediately pulled outwardly so that the only connection between the reel and the shaft 8 is the elastic connection afforded by the spring 11. Thus, no matter how hard the fish may jerk upon the line, the latter will merely pay out to some extent from the reel instead of breaking. As the line is thus pulled out, the spring 11 is wound, and then if the fish makes a sudden dart toward the fisherman, the spring 11 will rotate the reel to start winding the line, preventing possible snarling thereof. Continued winding may obviously be effected by rotating the shaft 8 with one or the other of the handles 34. Let us assume that the fish pulls outwardly upon the line and winds the spring 11 about to the maximum and that he then darts toward the fisherman, and continues moving in this direction until after the reel-winding power of the spring 11 is exhausted. Under such conditions, the spring will rotate the reel to wind the line up to a certain point and as the reel has been rapidly rotating under the influence of said spring, it will spin upon the shaft 8 even after the spring has ceased to function, provided the line is then still slack. This spinning is permitted by idle turning of the sleeve 13 and roller 16 about the shaft 8, and by this time, the line will be wound a great deal upon the reel, and the fish will be much nearer the reach of the fisherman than previously. Obviously, the spring 11 is not only tensioned by outward pulling on the line, but by turning the shaft 8, when the pin 19 is free from the pins or the like 21. At any propitious times, said pin 19 may be moved outwardly to positively connect the reel with the shaft, the dog 23 may be released, and the brake 25 used, such manipulations being left to the skill of the fisherman.

It will be seen from the foregoing that an unusually desirable reel has been provided, yet that it is comparatively simple and inexpensive. As excellent results have been obtained from the details disclosed, they are by preference followed, but within the scope of the invention as claimed, numerous modifications may be made.

I claim:

1. A fishing reel comprising a supporting structure including opposed end plates having central bearing openings, a hand-rotated shaft passing through said openings, a reel rotatable on said shaft and having cup-shaped end members whose cupped sides are closed by said end plates, a ratchet wheel secured on the shaft within one of said end members, a releasable dog also within said one end member and co-operable with said ratchet wheel to hold the shaft against retrograde movement, a line-winding spiral spring around the shaft within the other end member of the reel, a direct connection between the outer end of said spring and said other end member, and a ratchet connection between the inner end of the spring and the shaft, said ratchet connection permitting free spinning of the reel on the shaft in line-winding direction when the line-winding power of the spring is expended.

2. A fishing reel comprising a supporting structure including a pair of opposed end members having central bearing openings, a hand-rotated shaft passing through said openings, a reel rotatable on said shaft and having a pair of end members, the end members of at least one of said pairs being cupped and having their cupped sides closed by the other end members, a ratchet wheel secured on the shaft within one of said cupped end members, a releasable dog also within said one cupped end member and cooperable with said ratchet wheel to hold the shaft against retrograde movement, a line-winding spiral spring around the shaft within the other cupped end member, a direct connection between the outer end of said spring and the adjacent end member of the reel, and a ratchet connection between the inner end of the spring and the shaft, said ratchet connection permitting free spinning of the reel on the shaft in line-winding direction when the line-winding power of the spring is expended.

In testimony whereof I have hereunto affixed my signature.

ALBERT A. UNRUH.